United States Patent [19]
Street et al.

[11] Patent Number: 5,706,758
[45] Date of Patent: Jan. 13, 1998

[54] AUTOMATIC MILKING

[75] Inventors: Michael John Street, Bedford; Toby Trevor Fury Mottram, Chard; Arthur Leonard Wilkin, Hitchin; Robert Christopher Hall, St. Albans, all of England

[73] Assignee: British Technology Group, Ltd., London, England

[21] Appl. No.: 566,053

[22] Filed: Dec. 1, 1995

Related U.S. Application Data

[63] Continuation of Ser. No. 167,996, filed as PCT/GB92/01110 Jun. 19, 1992, Pat. No. 5,479,876.

[30] Foreign Application Priority Data

Jun. 20, 1991 [GB] United Kingdom ............... 9113405.6

[51] Int. Cl.⁶ .................................................. A01J 5/017
[52] U.S. Cl. .......................................... 119/14.08; 119/14.1
[58] Field of Search ....................... 119/14.08, 14.1, 119/14.18

[56] References Cited

U.S. PATENT DOCUMENTS

| | | | |
|---|---|---|---|
| 4,867,103 | 9/1989 | Montalescot et al. | 119/14.08 |
| 4,941,433 | 7/1990 | Hanauer | 119/14.02 |
| 5,069,160 | 12/1991 | Street et al. | 119/14.08 |
| 5,279,253 | 1/1994 | Lubberink | 119/14.08 |

FOREIGN PATENT DOCUMENTS

| | | |
|---|---|---|
| 320496 | 6/1979 | European Pat. Off. . |
| 091892 | 10/1983 | European Pat. Off. . |
| 188303 | 7/1986 | European Pat. Off. . |
| 213660 | 3/1987 | European Pat. Off. . |
| 300115 | 4/1989 | European Pat. Off. . |
| 332232 | 9/1989 | European Pat. Off. ............ 119/14.08 |
| 360354 | 3/1990 | European Pat. Off. ............ 119/14.08 |
| 2595197 | 9/1987 | France . |
| 2605841 | 5/1988 | France . |
| 3931769 | 4/1991 | Germany . |
| 2226941 | 7/1990 | United Kingdom . |

OTHER PUBLICATIONS

PCT/GB91/01831 — WO 92/06588 — Apr. 30, 1992.

*Primary Examiner*—Robert P. Swiatek
*Attorney, Agent, or Firm*—Cushman, Darby & Cushman IP Group of Pillsbury, Madison & Sutro, LLP

[57] ABSTRACT

An arrangement for the automatic application of milking apparatus to a milk animal including a milking apparatus store, a milking apparatus handling device including a milking apparatus carrier movable on the device and a teat sensor on the handling device together with at least one animal position sensor and a control unit responsive to the animal and teat sensors to operate the handling device, the arrangement being such that when an animal is sensed to be in milking position the control unit operates the handling device to take milking apparatus for a teat of the animal from the store in the carrier to a specific teat with the carrier moved to a sideways offset at a selected angle to the device and the teat sensor in range of the teat.

28 Claims, 3 Drawing Sheets

AUTOMATIC MILKING

This is a continuation of application Ser. No. 08/167,996, filed May 6, 1994, now U.S. Pat. No. 5,479,876, which was based on PCT/GB92/01110 filed Jun. 19, 1992.

This invention relates to the automatic application of milking apparatus to a milk animal such as a cow or a goat but is not restricted to these.

Techniques for the automatic application of milking apparatus are known, for example published patent Applications GB 2226941 (NRDC), EP 0213660 (Multinorm), EP 0300115 (DUVELSDORF), FR 2595197 (CEMAGREF) and the documents mentioned therein. In these techniques an automatic device, which includes or can acquire a milking apparatus such as one or more teat cups, follows the general movement in a stall of the animal to be milked to guide the milking apparatus to the general area of the udder of the animal and then uses a localised sensing apparatus to guide the milking apparatus on to an appropriate teat. It is well-known that cleanliness is vital for milking techniques but so far little attention has been given to the cleanliness problems that may arise in automatic milking.

It is an object of the present invention to provide automatic milking techniques in which cleanliness is easier to maintain.

According to the invention there is provided an arrangement for the automatic application of milking apparatus to an animal characterised by a milking apparatus store, a milking apparatus handling device including a milking apparatus carrier movable on the device and a teat sensor on the handling device together with at least one animal position sensor and a control unit responsive to the animal and teat sensors to operate the handling device, the arrangement being such that when an animal is sensed to be in milking position the control unit operates the handling device to take milking apparatus for a teat of the animal from the store in the carrier to a specific teat with the carrier moved to a sideways offset at a selected angle to the device and the teat sensor in range of the teat.

The carrier may be movable to turn a milking apparatus taken inverted to be upright. The teat sensor may be an open-jaw sensor effective to sense the teat by a sideways approach. The handling device may include a pivot and said carrier may be movable about said pivot between an inverted and an upright position and operable to acquire inverted milking apparatus from said store and said carrier may be effective by a single pivot action both to turn the acquired inverted apparatus upright and to position the upright apparatus offset from the handling device.

The handling device may include a guided elongate support member having pivoted at an outward end said carrier in the form of a teat-cup gripper, the axis of the pivot for the gripper being inclined at an angle to the elongate member but generally in the horizontal plane of the member. The angle may be approximately 45°. The support member may have at an inboard end a drive for said carrier and a drive shaft within the member to transmit drive to said carrier.

Conveniently the milking apparatus is individual teat cups hung inverted in a store by the milk hose alone and after release retractable into said store by pulling with the milk hose. The milk hose may be siamesed or otherwise combined with the pulsator hose. The milking apparatus may be individual teat cups each on a respective milk hose and held in a store to be above the level of the floor of a rear part of a stall at the milking position and beneath a raised front part of the stall. The individual teat cups may be taken from the store through a step in the floor of the stall to a raised front part of the stall floor.

The milking apparatus store may be at any convenient place adjacent or, if protected, within the stall. The store may be outside the stall adjacent the position of the fore or hind legs of an animal correctly in the stall. The movement and offset of the carrier may be chosen to suit the position of the store and the handling device.

The handling device may include a teat sensor of an open-jaw sensing arrangement having optical sensing beams directed to cross obliquely. The carrier may include an open-jaw sensing arrangement arranged above the gripper, with reference to the upright position, and including optical sensing beams directed to cross obliquely, effective to operate by sideways approach to a teat with the sensor above the lower end of the teat and the milking apparatus below said lower end.

Conveniently the handling means includes means to position a milking apparatus holding part to acquire the inverted apparatus and by movement of the holding part to move the acquired apparatus to the upright position for application to the animal.

Conveniently the milking apparatus is cleansed in the store in the inverted position to allow drainage.

Preferably said arrangement is at one side of a stall for an animal to be milked and said store is at the opposite side of said stall and said handling means is operable to extend under an animal in said stall to acquire apparatus from said store and retract and move rearwardly of an animal in said stall for application of said acquired apparatus to said animal.

The gripping means may be arranged to carry said apparatus in a retracted mode until an application position is achieved, the means being operable on the achievement of said application position to bring the apparatus to an active mode for application to an animal.

The invention also provides a method of automatically applying a milking apparatus to a milk animal including loosely retaining an animal at a milking position, providing a milking apparatus handling device alongside said position, acquiring with said device from a store above floor level a milking apparatus, supporting said apparatus on said device adjacent a teat sensor, offsetting said supported apparatus in said device, causing or permitting said supported apparatus to approach a selected teat of said animal and be applied to said teat.

Embodiments of the invention will now be described with reference to the accompanying drawings in which.

Figure 4:
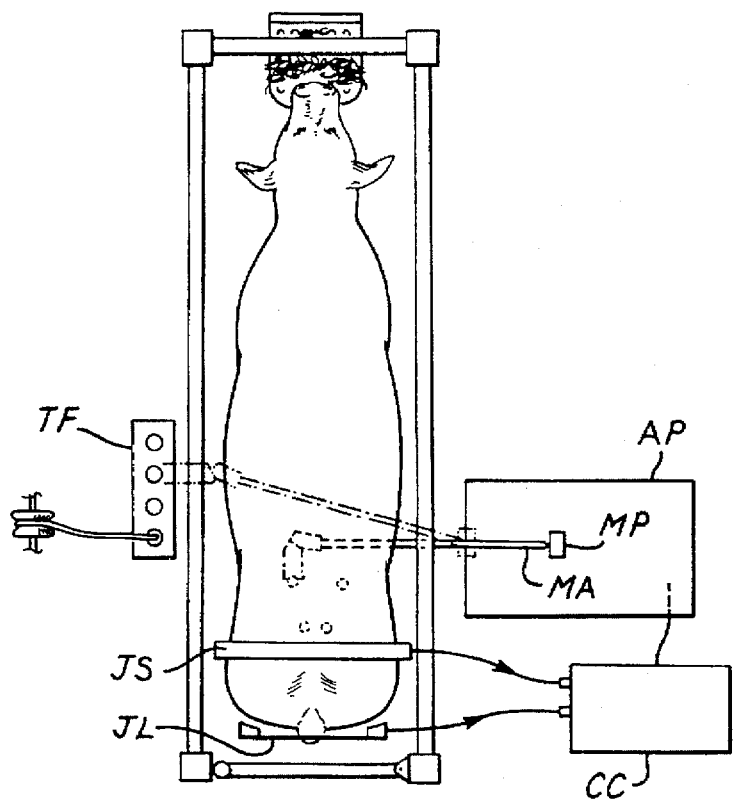
FIG. 4 is a schematic plan view of a typical arrangement.

As shown in FIG. 4, the general arrangement embodying the invention is a stall in which an animal, for this example a cow, is loosely retained. Preferably the front part of the stall floor is higher than that at the rear (e.g. as described in UK patent application 9022804.0 and PCT patent application GB91/01831 incorporated by reference herein) and there is a manger at the front of the stall. Feed may be supplied to the manger in a controlled manner, for example an initial quantity followed by small amounts at intervals so that the head of the animal is attracted to the manger and maintains a steady position of the whole animal, reducing movement of the udder. An interval of 10 to 15 seconds has been found useful. To one side of the stall is an automatic milking apparatus handling device, a "robot AP", and on the opposite side of the stall is a store TF for milking apparatus, typically several distinct teat cups. The arrangement is such that the robot can extend across the stall under the animal to acquire an inverted teat cup, turn the teat cup upright and attach the cup to a specific teat.

Figure 1:
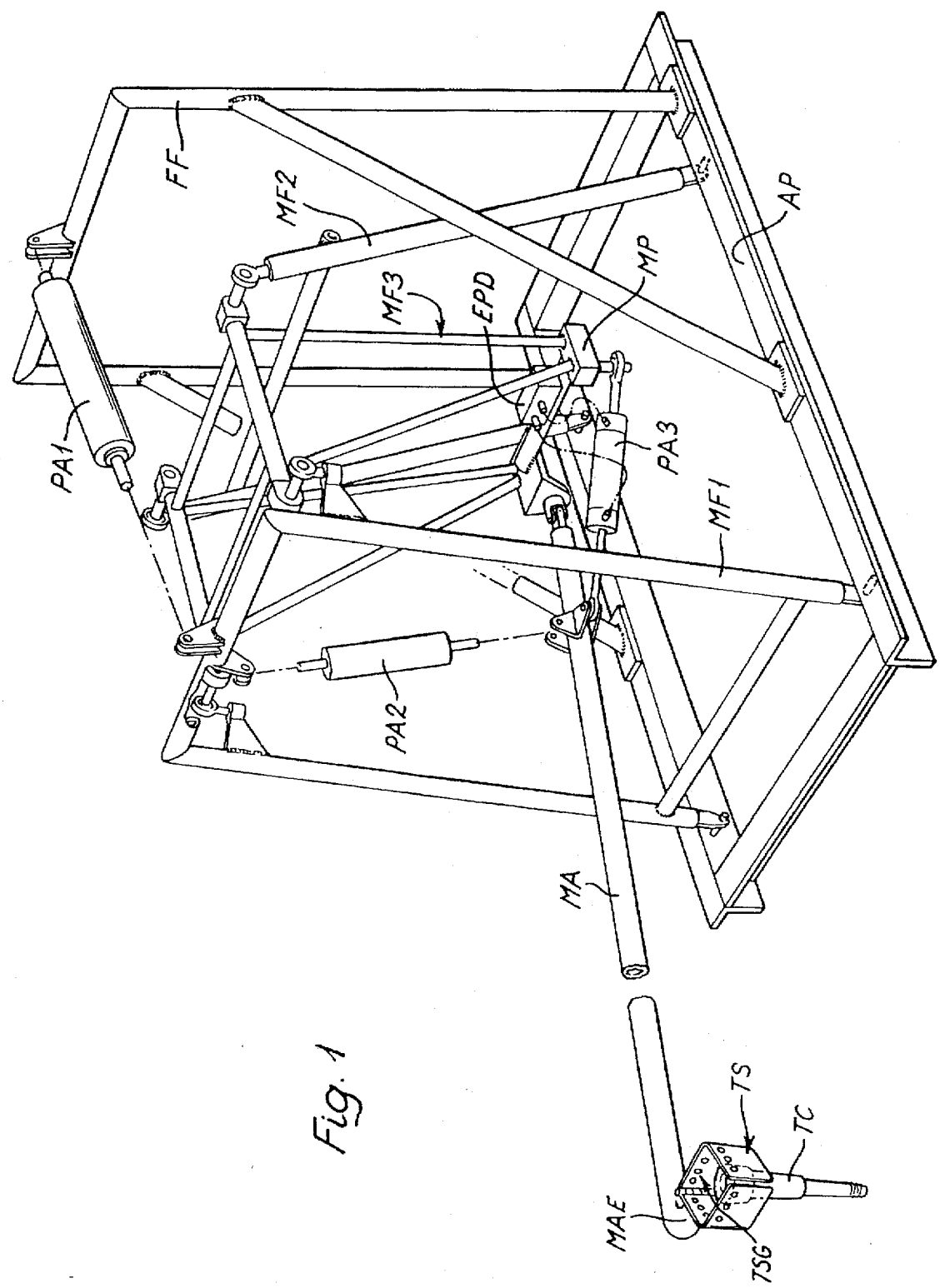
FIG. 1 is a general view of a milking "robot"

Typically the robot can be as illustrated in GB-A-2226941, for example as in FIG. 8 thereof included herein as FIG. 1, and have a generally horizontal elongate member MA supported at support MP and controlled by control device CC (FIG. 4) to be swingable and longitudinally displaceable beneath an animal in the stall. FIG. 1 shows the teat-cup holder of GB-A-2226941 but this is fixed and requires an opening action to receive a teat-cup TC and is to be considered as fitted with the arrangements now to be described for the purposes of the following.

The teat-cup holder of GB-A-2 226 941, which is fixed and requires the opening action to receive a teat cup, has at the outer end MAE of the arm MA an array TSG of optical sensor devices supported in an open-topped box TS. As shown in FIG. 1 a platform supports a frame work a part of which FF is rigidly mounted on the platform and two parts of which MF1, MF2 are pivotally mounted on the platform. A further moveable framework part MF3 is in turn pivotally mounted on the moveable parts MF1, MF2. Pneumatic actuators link the moveable parts and the fixed part to control the positions of the parts. Actuator PA3 is controlled from an electro pneumatic converter device EPD. The outer end MAE of arm MA is moveable in the to-and-fro direction by the action of actuator PA1 on moveable part MF1 and can be swung across this direction (vertically and/or horizontally) by the appropriate actions of one or both of actuators PA2, PA3.

At the end of the elongate member is a handling means including a gripping means pivoted on an axis inclined to the axis of the elongate member so that the gripping means can be moved from extending generally along the axis of the member to extending generally horizontally and at right angles to the axis of the member by a single pivoted action which also inverts the gripping means. The handling means includes an open-jaw optical sensing arrangement SM (FIG. 2) associated with the gripping means to detect the presence of a teat above a teat cup held in the gripping means and determine when to raise the teat cup to be then drawn onto the teat in the conventional way by the vacuum applied to the teat cup. This provides a second, localised, control in addition to a first, general, control provided by sensing means JS, JL (FIG. 4) responsive to the movement of the animal in the stall. The robot operates the elongate member to move the gripping means, in the position (inverted) extending generally along the axis of the member, to take up an inverted teat cup. The robot then operates to move the teat-cup toward the udder and turn the teat cup upright. The action of the pivot mentioned above is to bring the upright teat cup to one side of the elongate member. This facilitates the application of the teat cup to a teat. The exact angle of the pivot axis to the elongate member can be chosen to suit a particular arrangement. In some embodiments to be described below the teat-cups are stored in a position other than inverted, for example parallel to the floor, but above the floor to ensure cleanliness. On release from a teat a cup may fall to the floor but the cup is cleanable, for example by back-flushing and draining or air-blowing, to ensure cleanliness.

Figure 2:
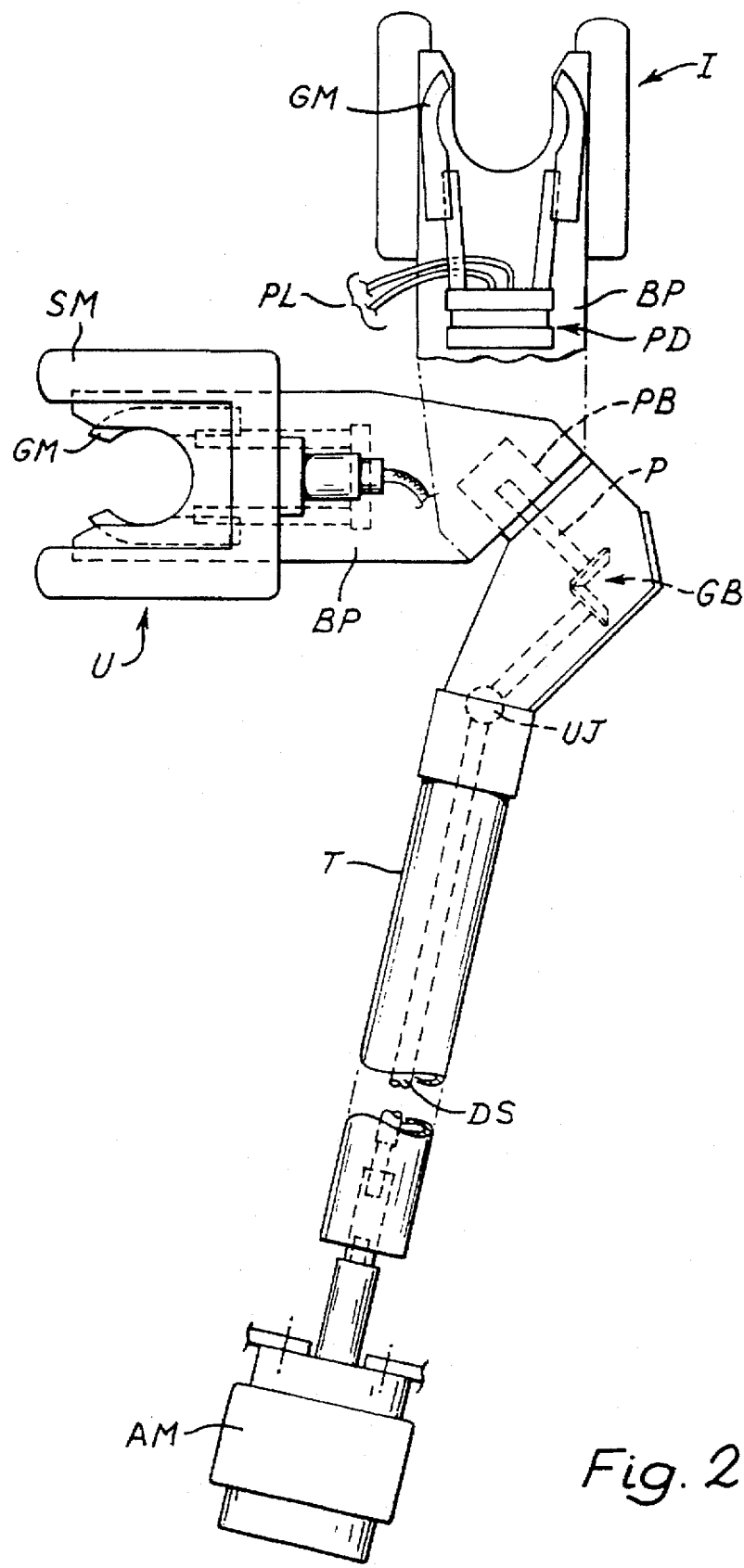
FIG. 2 is a plan view of a handling means showing two alternative settings of the handling means.
Figure 3:
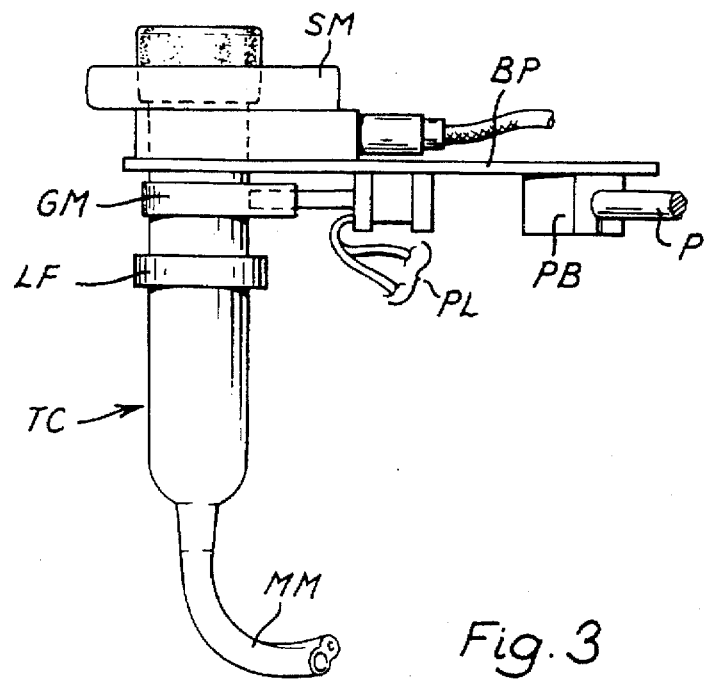
FIG. 3 is a side view of part of the handling means in FIG. 2.

FIG. 2 shows a plan view of a handling means embodying the invention and FIG. 3 shows a side view of part of the handling means in FIG. 2. The handling means is on an extension of the elongate member MA in FIG. 1 (not shown in FIG. 2) and is supported on the outer end of a tube T with a drive shaft DS, operated by an air motor AM, extending inside the tube. In a preferred arrangement the air motor is inboard of the attachment point of actuators PA2 and PA3 to member MA and tube T is effectively the greater part of member MA. At the outer end of tube T is a pivot P mounted in pivot bearing PB for gripping means GM and an associated sensing means SM mounted on a gearbox GB. The axis of pivot P is inclined at approximately 45° to the axis of the elongate member MA, in the horizontal plane in use, and the pivot carries a slot-ended baseplate BP on which the gripping means GM and sensing means SM are carried. The drive shaft DS is connected to the gearbox GB by a universal joint U3 so that, in operation, the air motor can be energised to rotate the baseplate BP about the axis of pivot P to move it and the supported elements between the inverted position, indicated at I, and the upright position, indicated at U. In the inverted position the baseplate extends from the tube T approximately in the direction of the tube and in the upright position extends at approximately right angles to the direction of the tube. Suitable stops or other devices to control or limit the rotation of the baseplate can be provided.

This simple movement, conveniently called a wrist-action, about a single pivot provides a robust, economic arrangement which can acquire an inverted teat cup by reaching beneath an animal to a teat cup store and then turn the teat cup upright and hold it in the appropriate position for sideways movement towards the udder. Clearly by simple alterations of dimensions and angles teat-cups stored in other orientations and positions can be acquired. Furthermore other equipment than a teat-cup carrier can be fitted by arranging a plug-in connection to the tube T, and drive shaft DS if required. For example teat inspection and cleaning devices or other "end-effectors" may be provided so that the arrangement can carry out various functions at the milking position or such an arrangement can be used before or after the milking position. Those skilled in the art will be able to readily produce such adaptions, given the guidance in this description.

The gripping means GM is conveniently operated by a pneumatic device PD supplied by pneumatic supply lines PL to open and close the gripping means as required.

The teat cups, one being shown in FIG. 3 at TC, are of generally conventional form each having a milking hose MH of the "siamesed" type, combining the pulsator and milk hoses in a single element of generally figure-eight cross-section. The store TF, positioned alongside the stall opposite the robot AP as indicated in FIG. 4, carries the teat cups in the inverted position hanging on the milking hoses. A location flange LF on each teat cup limits the amount by which a teat cup can be drawn into the store by tension applied to the milking hose. The gripping means GM acquires a teat cup by gripping the cup below, in the inverted sense of the cup, the flange LF. When the air motor AM is energised to turn the cup upright the cup can then rest on the baseplate and in the slot end of the plate. This leaves the sensing means SM to respond to a teat within the open-jaw of the sensing means and position the cup below the teat. If required the gripper GM can be arranged to have different degrees of grip so that the height of the cup in the holding means can be controlled. The robot is then operated to raise the holding means and thus the teat cup towards the teat so that the vacuum applied to the cup can draw the cup onto the teat. After milking the vacuum can be stopped to allow the teat cup to fall away from the teat and be withdrawn to the store by tension on the milking hose applied in any convenient manner.

The sensing means SM includes a number of optical transmitters and receivers to provide crossing light beams in the space inside the sensing means which can determine, with suitable circuit means, the position of a teat in the sensing means so that the teat cup can be moved below the teat. The beams are conveniently arranged generally diagonally, apart from one directly across near the open end and one directly across near the closed end of the sensing means. There may be three diagonal beams from each side, inclined at some 60° to the side to form an obliquely crossing pattern. Suitable machining or moulding of the housing for the optical devices provides positioning for the devices at required angles. An important feature is that the sensing means does not have moving parts, as hitherto has been the case to enable the sensing means to be opened to allow entry of the teat cup, being an open-jaw form. Avoidance of moving parts greatly increases reliability, reduces cost and eases cleaning. A separate electrical cable for the sensor signal information is preferred to improve noise resistance.

Reference has been made to other positions for the teat-cup store. Instead of being on the other side of the animal from the robot AP the store can be on the same side but adjacent the front or hind legs of the animal and outside the stall. The teat-cups can be stored upright or inverted as preferred and suitable cleaning arrangement provided. Adjustments to the wrist action will be readily apparent to those skilled in the art. The offset angle may be a right angle and the carrier may move from a right angle offset to one side of the member to a right angle offset on the other side. The various actions and operations are regulated by a central controller CC in FIG. 4.

The inverted teat cups hanging in the store relatively free of obstruction can be cleaned in place by flushing and allowing to drain. No connection other than the milking hose is needed, again simplifying construction and aiding cleanliness particularly as the milking apparatus is usually allowed to fall to the floor of the stall and then dragged across it. The simple arrangement of the gripping and sensing means with a single pivot also assists cleanliness. The open jaw sensor enables the teat-cup to approach at a higher level than when a closed sensor is used. A spray for the udder of the animal may be provided at the exit from the stall and operated by the animal leaving the stall stepping down form a raised part. This improves spray access.

The techniques described above provide significant improvements in the teat-cup applying a stage of automatic milking by simplifying construction and operation and aiding cleanliness.

We claim:

1. An arrangement for automatic application of milking apparatus to an animal, said arrangement comprising:
   a milking apparatus store;
   a milking apparatus handling device including:
      a milking apparatus carrier movable on said milking apparatus handling device, and
      a teat sensor on said milking apparatus handling device;
   at least one animal position sensor; and
   a control unit responsive to the animal and said teat sensor to operate said milking apparatus handling device;
   wherein when the animal is sensed to be in a milking position, said control unit operates said milking apparatus handling device to take milking apparatus for a teat of the animal from said milking apparatus store in said milking apparatus carrier to a specific teat with said teat sensor in range of the teat;
   said control unit moving said milking apparatus carrier relative to said milking apparatus handling device between a first position when acquiring said milking apparatus at said milking apparatus store, to a second position when applying said milking apparatus to a teat, said milking apparatus carrier in said second position being offset sideways from said milking apparatus handling device to a greater extent than said milking apparatus carrier in said first position.

2. An arrangement for automatic application of milking apparatus to an animal according to claim 1, wherein:
   said milking apparatus carrier is movable to turn said milking apparatus taken inverted to be upright.

3. An arrangement for automatic application of milking apparatus to an animal according to claim 1, wherein:
   said teat sensor is an open-jaw sensor effective to sense the teat by a sideways approach.

4. An arrangement for automatic application of milking apparatus to an animal according to claim 1, wherein:
   said milking apparatus handling device includes a pivot;
   said milking apparatus carrier is movable about said pivot between an inverted position and an upright position;
   said milking apparatus carrier is operable to acquire said milking apparatus in an inverted position from said milking apparatus store; and
   said carrier is effective by a single pivot action both to turn said milking apparatus acquired in an inverted position to an upright position, and to position said milking apparatus in said upright position to be offset from said milking apparatus handling device a first amount different from a second amount of offset between said milking apparatus in said inverted position and said milking apparatus handling device.

5. An arrangement for automatic application of milking apparatus according to claim 1, wherein said milking apparatus handling device includes:
   a guided elongate support member having said milking apparatus carrier pivoted at an outward end thereof;
   said milking apparatus carrier being a teat-cup gripper; and
   an axis of pivot for said teat-cup gripper being inclined at an angle to said guided elongate support member and being generally in a horizontal plane of said guided elongate support member.

6. An arrangement for automatic application of milking apparatus according to claim 5, wherein:
   said angle is 45°.

7. An arrangement for automatic application of milking apparatus according to claim 5, wherein:
   said guided elongate support member includes at an inboard end thereof:
      a drive for said milking apparatus carrier, and
      a drive shaft within said guided elongate support member to transmit drive to said milking apparatus carrier.

8. An arrangement for automatic application of milking apparatus according to claim 5, wherein said milking apparatus carrier includes:
   an open-jaw sensing arrangement arranged above said teat-cup gripper, with reference to an upright position, and
   optical sensing beams directed to cross obliquely, said optical sensing beams operating by sideways approach to a teat with said teat sensor above a lower end of the teat and said milking apparatus below said lower end of the teat.

9. An arrangement for automatic application of milking apparatus according to claim 1, wherein:

said milking apparatus is individual teat cups each on a respective milk hose and hung inverted in said milking apparatus store by said respective milk hose alone, said individual teat cups being retractable into said milking apparatus store by pulling with said respective milk hose.

10. An arrangement for automatic application of milking apparatus according to claim 1, wherein:

said milking apparatus is individual teat cups each on a respective milk hose and held in said milking apparatus store above a level of a floor of a rear part of a stall at said milking position and beneath a raised front part of said floor.

11. An arrangement for automatic application of milking apparatus according to claim 10, wherein:

said individual teat cups are taken from said milking apparatus store through a step in said floor of said stall to said raised front part of said floor.

12. An arrangement for automatic application of milking apparatus according to claim 1, wherein:

said teat sensor includes an open-jaw sensing arrangement having optical sensing beams directed to cross an open-jaw area obliquely.

13. An arrangement for automatic application of milking apparatus according to claim 1, wherein:

said milking apparatus is held and cleansed in said milking apparatus store in an inverted position to allow drainage.

14. An arrangement for automatic application of milking apparatus according to claim 1, wherein:

said arrangement being installed at a first side of a stall for an animal to be milked;

said milking apparatus store being disposed at a second side of said stall opposite said first side of said stall; and said milking apparatus handling device is operable to extend under the animal in said stall to acquire said milking apparatus from said milking apparatus store, to retract, and to move rearwardly in a head to tail direction of the animal in said stall for application of said acquired milking apparatus to the animal.

15. Apparatus for applying milking apparatus to an animal, said apparatus comprising:

a plurality of teat cups;

a milking apparatus store to store said plurality of teat cups;

an elongated member having a first end and a second end;

a milking apparatus handling device at said second end of said elongated member, said milking apparatus including a teat cup carrier rotatable on a single axis with respect to said animal, said single axis rotation placing said teat cup carrier in a first orientation with respect to said teat in a first rotated position, and placing said teat cup carrier in a second orientation inverted approximately 180° from said first orientation in a second rotated position, a first distance between said first end of said elongated member and said teat cup carrier placed in said first rotated position being significantly not equal to a second distance between said first end of said elongated member and said teat cup carrier placed in said second rotated position;

a teat sensor on said milking apparatus handling device to sense a position of a teat of said animal with respect to said milking apparatus handling device;

at least one animal position sensor; and a control unit responsive to a position of said animal sensed by said at least one animal position sensor and responsive to said position of said teat sensed by said teat sensor, said control unit operating said milking apparatus handling device between a first teat cup position with said teat cup on said teat and said teat cup carrier in said first rotated position, and a second teat cup position with said teat cup on said milking apparatus store and said teat cup carrier in said second rotated position.

16. Apparatus for applying milking apparatus to an animal according to claim 15, wherein:

said teat sensor is an open-jaw sensor.

17. Apparatus for applying milking apparatus to an animal according to claim 15, wherein:

said teat sensor includes optical sensing beams directed to cross obliquely.

18. Apparatus for applying milking apparatus to an animal according to claim 15, wherein an axis of rotation of said teat cup carrier is at an angle of approximately 45° with respect to said elongated member.

19. Apparatus for applying milking apparatus to an animal according to claim 15, further comprising:

a plurality of hoses connected respectively to said plurality of teat cups;

wherein said plurality of teat cups are stored in said milking apparatus store in a first position which is inverted from a second position in which said teat cups are placed on said teat.

20. Apparatus for applying milking apparatus to an animal according to claim 19, wherein said plurality of hoses are each retractable into said milking apparatus store by pulling on a respective one of said plurality of hoses.

21. Apparatus for applying milking apparatus to an animal according to claim 15, wherein:

said plurality of teat cups are stored in said milking apparatus store at a level above a floor of a rear part, of a stall holding said animal in a milking position and at a level beneath a raised front part of said stall.

22. Apparatus for applying milking apparatus to an animal according to claim 21, wherein:

said teat cup carrier includes a gripper; and said teat sensor includes optical sensing beams directed to cross obliquely, effective to operate by sideways approach to a teat with said teat sensor above a lower end of said teat and said milking apparatus below said lower end of said teat.

23. Apparatus for applying milking apparatus to an animal according to claim 15, wherein:

said plurality of teat cups are stored in said milking apparatus store in an inverted position so as to allow drainage therefrom.

24. Apparatus for applying milking apparatus to an animal according to claim 15, wherein:

said second end of said elongated member is pivoted on a first side of said animal; and said milking apparatus store is located on a second side of said animal opposite to said first side.

25. Apparatus for handling a teat cup, said apparatus comprising:

an elongated member having a first end and having a second end whereat said elongated member is pivoted;

a teat cup carrier connected to said first end of said elongated member, said teat cup carrier having a first portion and a second portion, said first portion being rotatable by approximately 180° with respect to said second portion between a first rotated position and a second rotated position, said first portion of said teat cup carrier including:

a gripper, and a teat sensor for sensing a position of a teat of said animal with respect to said teat cup carrier; and a drive mechanism in said teat cup carrier for rotating said first portion of said teat cup carrier with respect to said second portion of said teat cup carrier;

said first rotated position of said teat cup carrier placing said gripper a first linear distance from said second end of said elongated member, and said second rotated position of said teat cup carrier placing said gripper a second linear distance from said second end of said elongated member, said second linear distance being larger than said first linear distance.

26. Apparatus for handling a teat cup according to claim 25, wherein:

said teat sensor is an open-jaw sensor.

27. Apparatus for handling a teat cup according to claim 25, wherein:

said teat sensor includes optical sensing beams directed to cross obliquely, effective to operate by sideways approach to a teat with said teat sensor above a lower end of said teat and said milking apparatus below said lower end of said teat.

28. Apparatus for handling a teat cup according to claim 25, wherein:

an axis of rotation of said teat cup carrier is at an angle of approximately 45° with respect to said elongated member.

* * * * *